(12) United States Patent
Ecoff

(10) Patent No.: US 8,160,526 B2
(45) Date of Patent: Apr. 17, 2012

(54) FILTER CONFIGURATION FOR A RECEIVER OF MULTIPLE BROADCAST STANDARD SIGNALS

(75) Inventor: Clint Alan Ecoff, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1293 days.

(21) Appl. No.: 11/597,268

(22) PCT Filed: Aug. 13, 2004

(86) PCT No.: PCT/US2004/026427
§ 371 (c)(1), (2), (4) Date: Nov. 20, 2006

(87) PCT Pub. No.: WO2005/120054
PCT Pub. Date: Dec. 15, 2005

(65) Prior Publication Data
US 2008/0106650 A1    May 8, 2008

(51) Int. Cl.
*H04B 1/18* (2006.01)
*H04N 5/455* (2006.01)
(52) U.S. Cl. .......... 455/188.1; 455/191.1; 455/266; 455/306; 455/307; 455/340; 348/726
(58) Field of Classification Search .......... 455/188.1, 455/191.1, 266, 306–307, 340, 130, 150.1, 455/168.1, 176.1, 178.1, 179.1, 180.1, 187.1, 455/224, 227, 339, 309, 312; 348/558, 555, 348/556, 559, 725, 729, 731, 733, 726, E5.113
See application file for complete search history.

(56) References Cited

U.S. PATENT DOCUMENTS

| 4,792,993 | A |  | 12/1988 | Ma |  |
|---|---|---|---|---|---|
| 4,903,332 | A | * | 2/1990 | Hansen | 455/209 |
| 5,584,063 | A | * | 12/1996 | Brinkhaus | 455/266 |
| 5,673,088 | A | * | 9/1997 | Nah | 348/555 |
| 5,737,035 | A | * | 4/1998 | Rotzoll | 348/725 |
| 6,005,640 | A | * | 12/1999 | Strolle et al. | 348/726 |
| 6,177,964 | B1 | * | 1/2001 | Birleson et al. | 348/725 |
| 6,550,063 | B1 |  | 4/2003 | Matsuura |  |
| 6,963,623 | B2 | * | 11/2005 | Ninomiya et al. | 375/326 |
| 7,075,585 | B2 | * | 7/2006 | Favrat et al. | 348/554 |
| 7,133,081 | B2 | * | 11/2006 | Ina et al. | 348/678 |
| 7,151,577 | B2 | * | 12/2006 | Yamamoto et al. | 348/729 |

(Continued)

FOREIGN PATENT DOCUMENTS
JP    2002335177    11/2002
(Continued)

OTHER PUBLICATIONS
Search Report dated Jan. 9, 2005.

*Primary Examiner* — Pablo Tran
(74) *Attorney, Agent, or Firm* — Robert D. Shedd; Joseph J. Opalach; Brian J. Cromarty

(57) ABSTRACT

A filter arrangement for a receiver for multiple broadcast signals includes a first filter for receiving a broadcast signal from a tuner, a second filter coupled to an output of said first filter, said second filter having a variable bandwidth response, said second filter providing an output for a demodulator; and a filter control responsive to said broadcast signal for controlling said variable bandwidth response of said second filter.

12 Claims, 3 Drawing Sheets

U.S. PATENT DOCUMENTS

| | | |
|---|---|---|
| 7,187,913 B1* | 3/2007 | Rahn et al. ............... 455/188.1 |
| 7,215,939 B2* | 5/2007 | Muterspaugh ............ 455/296 |
| 7,239,357 B2* | 7/2007 | Jaffe ............................ 348/726 |
| 7,342,614 B2* | 3/2008 | Mehr et al. ................. 348/731 |
| 7,551,229 B2* | 6/2009 | Ozaki et al. ................ 348/558 |
| 2001/0033625 A1 | 10/2001 | Ninomiya et al. |
| 2002/0073434 A1* | 6/2002 | Pience ........................ 725/119 |
| 2004/0004674 A1 | 1/2004 | Birleson |
| 2004/0061804 A1 | 4/2004 | Favrat et al. |

FOREIGN PATENT DOCUMENTS

JP 2003318999 11/2003

* cited by examiner

FILTER CONFIGURATION FOR A RECEIVER OF MULTIPLE BROADCAST STANDARD SIGNALS

This application claims the benefit, under 35 U.S.C. §365 of International Application PCT/US2004/026427, filed Aug. 13, 2004, which was published in accordance with PCT Article 21(2) on 15 Dec. 2005 in English and which claims the benefit of U.S. provisional patent application No. 60/572,335, filed May 19, 2004.

FIELD OF THE INVENTION

The present invention relates generally to broadcast signal receivers and, more particularly, to a surface acoustic wave Saw filter configuration for demodulation of multiple broadcast standard signals.

DESCRIPTION OF THE RELATED ART

Current receiver designs capable of receiving multiple broadcast standards' signals such as quadrature amplitude modulation QAM, Advanced Television Systems Committee ATSC and National Television System Committee NTSC require multiple expensive SAW filters in order to achieve the desired channel selectivity.

Various high definition television HDTV and set top box STB designs have utilized 4 SAW filters with multiple demodulators to demodulate QAM, ATSC and NTSC signals. A block diagram 100 of such a multiple SAW filter demodulator is shown in FIG. 1. The digital signal from the Analog/Digital tuner 101 is sent to a path of serial Digital Saw filters Digital SAW1 and Digital SAW2 102,103 connected to a QAM/ATSC demodulator 104. Analog signal from the tuner 101 is sent to a parallel path of an analog video SAW filter 105 and an analog audio SAW filter 106 coupled to an NTSC demodulator.

Other known receiver systems include arrangements similar to that of FIG. 1. Additional filtering is done digitally, where a reduction of SAW filters is employed. The additional digital filtering is an added cost premium to the overall cost of the receiver. In such a system, both SAW1 and SAW2 filters are of equal wide bandwidths. However, in certain modes, such as QAM or ATSC the additional digital filtering is required. An example of employing a dual SAW filter arrangement is exemplified by the block diagram 200 of FIG. 2. The digital output from the tuner 201 is passed through a series path of digital SAW1 202 and digital SAW2 filters that output to additional digital filtering in a QAM/ATSC demodulator 204. Furthermore, a design employing the dual SAW filter arrangement of FIG. 2 requires a Nyquist slope digital filter for the NTSC demodulation. This Nyquist slope filtering is an additional required cost.

Accordingly, there is a need for a minimal SAW filter arrangement for demodulation of multiple broadcast standards signals.

SUMMARY OF THE INVENTION

A multiple broadcast standards receiver arrangement includes a tuner for receiving a one of multiple broadcast signals, a first filter coupled to receive an output from the tuner, a second filter coupled to an output of the first filter, the second filter having a variable bandwidth response, a demodulator for an output from the second filter, and a filter control responsive to the one of multiple broadcast signals for controlling the variable bandwidth response of the second filter.

A filter arrangement for a receiver for multiple broadcast signals includes a first filter for receiving a broadcast signal from a tuner, a second filter coupled to an output of the first filter, the second filter having a variable bandwidth response, the second filter providing an output for a demodulator; and a filter control responsive to the broadcast signal for controlling the variable bandwidth response of the second filter.

A method for filtering one of multiple received broadcast standards signals comprising the steps of filtering a received broadcast signal with a first filter having a first frequency bandwidth response, filtering an output from the first filter with a second filter having a variable bandwidth response, and controlling the variable bandwidth response of the second filter in response to the received broadcast signal.

BRIEF DESCRIPTION OF THE DRAWINGS

A more complete understanding of the present invention may be obtained from consideration of the following description in conjunction with the drawings, in which.

To facilitate understanding, identical reference numerals have been used, where possible, to designate identical elements that are common to the figures.

DETAILED DESCRIPTION

Figure 1:
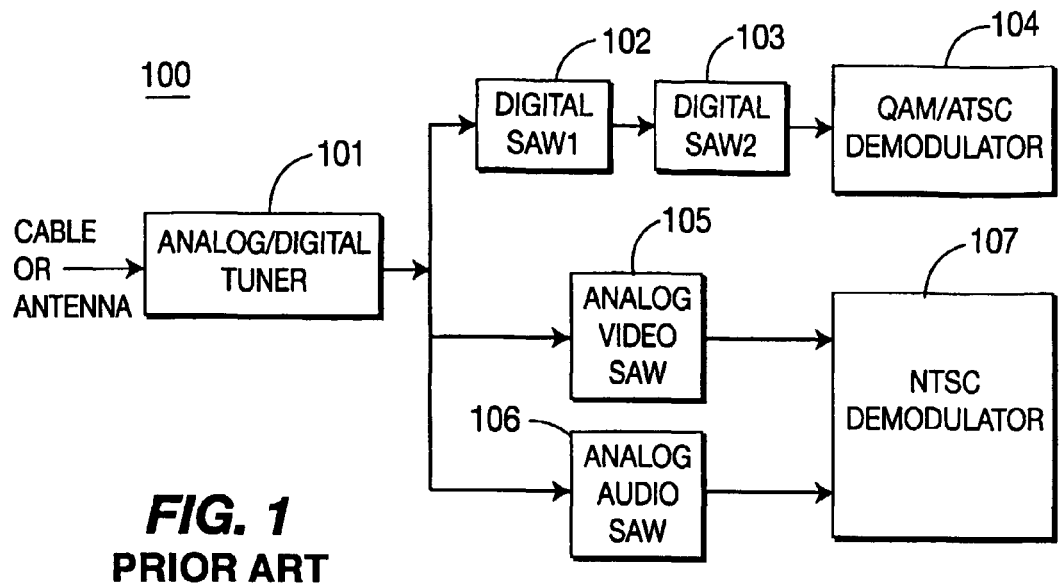
FIG. 1 is a block diagram of a prior art receiver design employing 4 digital SAW filters with multiple demodulators to demodulate QAM, ATSC and NTSC signals.
Figure 2:
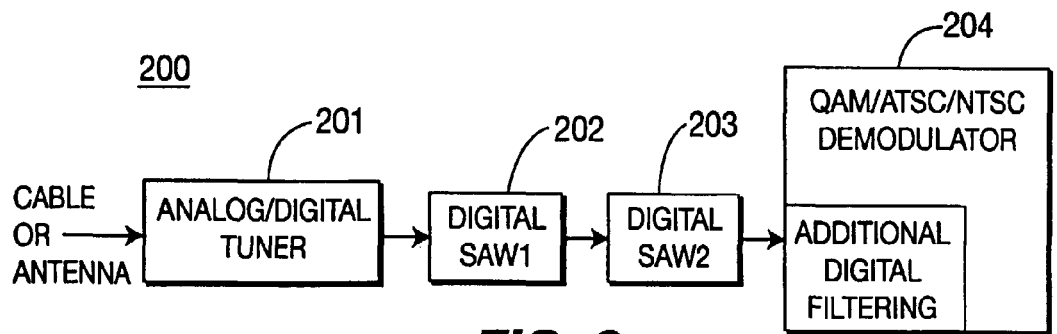
FIG. 2 is a block diagram of a prior art receiver arrangement employing 2 SAW filters.
Figure 3:
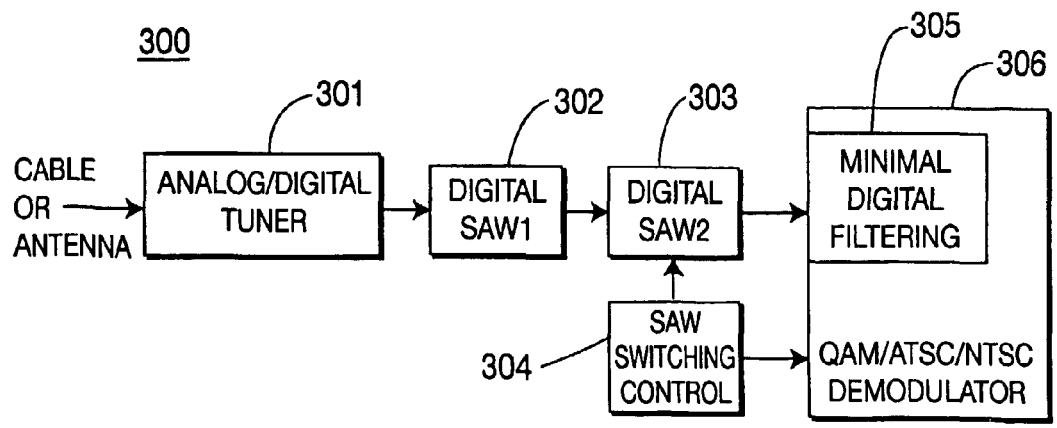
FIG. 3 shows a block diagram 300 of an exemplary SAW filter arrangement in accordance with the invention.

Referring to FIG. 3 there is shown a block diagram 300 of an exemplary SAW filter arrangement in accordance with the invention. The analog/digital tuner 301 receiving a broadcast signal over cable or antenna outputs through a series path of digital SAW1 and digital SAW2 filters 302,303 to a QAM/ATSC/NTSC broadcast standards' demodulator 305. The digital SAW2 filter has a switchable bandwidth responsive to a SAW switching control 304 tied from the SAW filter 303 back to the demodulator. The additional digital filtering for accommodating NTSC broadcast signals is minimal compared to that of prior dual SAW filter designs without switchable bandwidth control.

Figure 4:
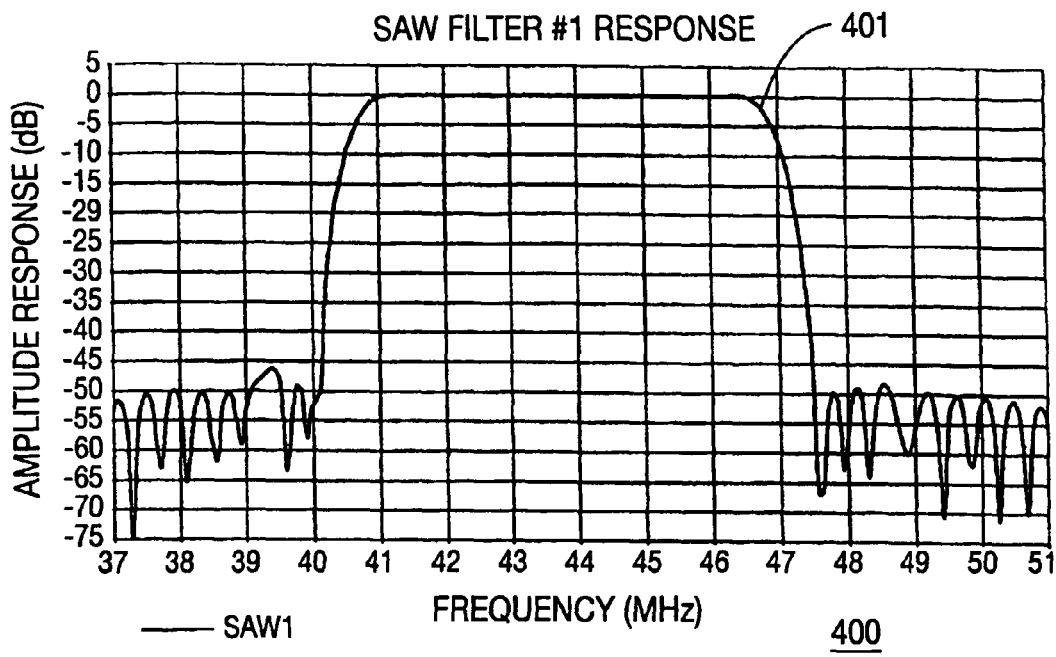
FIG. 4 shows an exemplary frequency response curve 400 for the digital SAW1 filter 302 in FIG. 3.

An exemplary frequency response curve 400 for the digital SAW1 filter 302 is shown in FIG. 4. The digital SAW1 frequency response 401 is essentially flat between the upper and lower cutoff frequencies of the desired channel.

Figure 5:
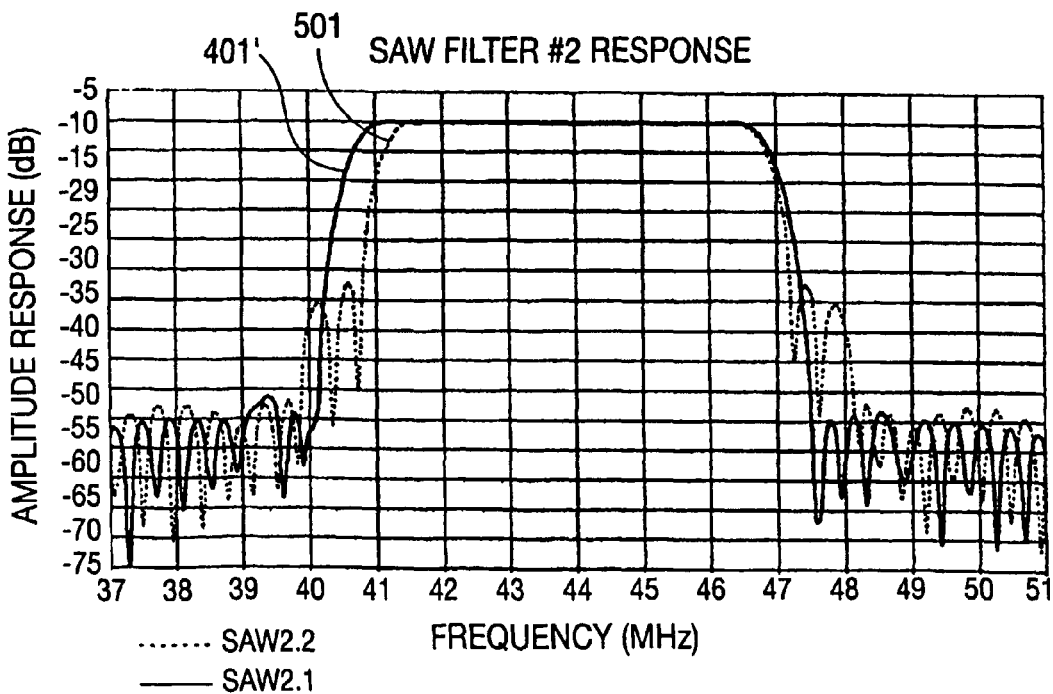
FIG. 5 shows a response curve plot for the digital SAW2 filter 303 in FIG. 3.

A response curve plot 500 for the digital SAW2 filter 303 is shown in FIG. 5. The digital SAW2 filter exhibits in one mode a response curve 401' identical to that of digital SAW1 filter shown in FIG. 4 and a reduced bandwidth frequency response 501 in a switched mode.

Figure 6:
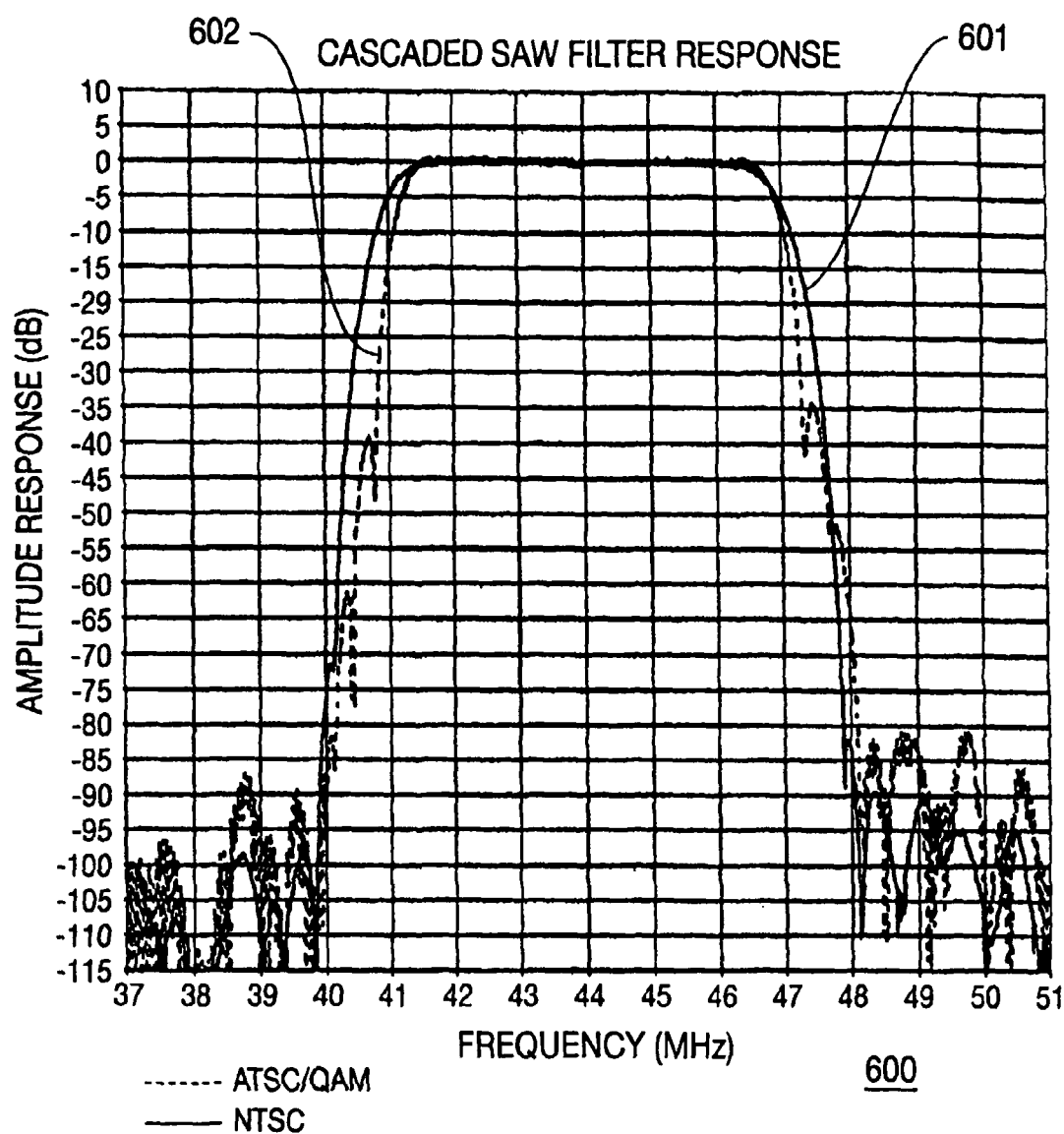
FIG. 6 shows two distinct frequency responses from cascading the digital SAW1 filter and bandwidth switchable digital SAW2 filter of FIG. 3.

Cascading the digital SAW1 filter and bandwidth switchable digital SAW2 filter provides for two distinct frequency responses 600, shown in FIG. 6. The wider bandwidth curve 601 allows full bandwidth of NTSC broadcast signals to pass (video and audio) to the demodulator 305. The narrower bandwidth curve allows full bandwidth of QAM and ATSC standards signals to pass to the demodulator 305, while improving selectivity in this mode. It is not desirable to pass NTSC signals through the narrower QAM/ATSC bandwidth path. Doing so would remove the NTSC sound carrier (41.25 MHz), which necessitates the need for a switchable bandwidth SAW filter design.

Although various embodiments which incorporate the teachings of the present invention have been shown and described in detail herein, those skilled in the art can readily devise many other varied embodiments that will still incorporate these teachings.

The invention claimed is:

1. A multiple broadcast standards receiver arrangement comprising:
    a tuner for receiving a one of multiple broadcast signals;
    a first filter coupled to receive an output from said tuner, said first filter having a fixed bandwidth response, wherein said first filter passes QAM and ATSC broadcast signals received;
    a second filter coupled to an output of said first filter, said second filter having a variable bandwidth response, wherein said variable bandwidth response of said second filter and said fixed bandwidth response of said first filter comprise a common center frequency, wherein said second filter passes NTSC broadcast signals;
    a demodulator for an output from said second filter; and
    a filter control responsive to said one of multiple broadcast signals for controlling said variable bandwidth response of said second filter.

2. The receiver arrangement of claim 1, wherein said second filter has a first frequency bandwidth response and a second frequency bandwidth response, said first frequency bandwidth response being substantially similar to that of a frequency bandwidth response for said first filter, said second frequency bandwidth response being narrower than said frequency bandwidth response for said first filter.

3. The receiver arrangement of claim 1, wherein said first and second acoustic filters are digital surface acoustic wave filters.

4. The receiver arrangement of claim 1, wherein said demodulator comprises a digital filter for said output from said second filter.

5. The receiver arrangement of claim 1, wherein said tuner comprises tuning for analog and digital broadcast signals.

6. A filter arrangement for a receiver for multiple broadcast signals comprising:
    a first filter for receiving a broadcast signal from a tuner, wherein said first filter has a fixed bandwidth response, and wherein said first filter passes QAM and ATSC broadcast signals received;
    a second filter coupled to an output of said first filter, said second filter having a variable bandwidth response, said second filter providing an output for a demodulator, wherein said variable bandwidth response of said second filter and said fixed bandwidth response of said first filter comprise a common center frequency, and wherein said second filter passes NTSC broadcast signals; and
    a filter control responsive to said broadcast signal for controlling said variable bandwidth response of said second filter.

7. The filter arrangement of claim 6, wherein said second filter has a first frequency bandwidth response and a second frequency bandwidth response, said first frequency bandwidth response being substantially similar to that of a frequency bandwidth response for said first filter, said second frequency bandwidth response being narrower than said frequency bandwidth response for said first filter.

8. The filter arrangement of claim 6, wherein said first and second surface acoustic wave filters are digital surface acoustic wave filters.

9. A method for filtering one of multiple received broadcast standards signals comprising the steps of:
    filtering a received broadcast signal with a first filter having a fixed frequency bandwidth response;
    filtering an output from said first filter with a second filter having a variable bandwidth response, wherein said variable bandwidth response of said second filter and said fixed bandwidth response of said first filter comprise a common center frequency, wherein said second filter has a first bandwidth response substantially similar to that of a bandwidth response for said first filter for passing NTSC broadcast signals and a second bandwidth response narrower than said bandwidth response for said first filter for passing ATSC and QAM broadcast signals; and
    controlling said variable bandwidth response of said second filter in response to said received broadcast signal.

10. The method of claim 9, wherein further comprising the step of digital filtering an output from said second filter.

11. The method of claim 9, wherein said second filter has a first frequency bandwidth response and a second frequency bandwidth response, said first frequency bandwidth response being substantially similar to that of said fixed frequency bandwidth response for said first filter, said second frequency bandwidth response being narrower than said fixed frequency bandwidth response for said first filter.

12. The method of claim 9, wherein said first and second filters comprise digital surface acoustic wave filters.

* * * * *